United States Patent Office 2,917,543
Patented Dec. 15, 1959

2,917,543
PROCESS OF PRODUCING SUBSTITUTED BORAZOLES

Janet Hall Smalley, Norwalk, and Stanley F. Stafiej, Stamford, Conn., assignors to American Cyanamid Company, New York, N.Y., a corporation of Maine No Drawing. Application April 7, 1958
Serial No. 726,622

7 Claims. (Cl. 260—551)

This invention relates to a method of producing certain compounds comprising boron and nitrogen, and more especially is concerned with a method of preparing a particular class of borazoles (also known as borazines). Still more particularly, the invention relates to a new and improved method of producing substituted borazoles represented by the general formula (I)

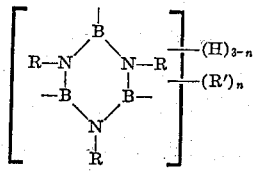

where R represents a member of the class consisting of hydrogen and hydrocarbon radicals, R' represents a hydrocarbon radical, and $n$ represents a number from 1 to 3, inclusive. The hydrocarbon radicals represented by R and R' can be the same or different. For example, all of the radicals represented by R can be the same, and all those represented by the R' can be the same, but the latter being different from those represented by R; or some of the radicals represented by R' can be different from each other and from some or all of those represented by R, which latter can be the same or different. To the best of our knowledge and belief, R and R' can be any hydrocarbon radical, that is, a radical composed solely of carbon and hydrogen.

Briefly described, the method of the present invention comprises effecting reaction between (A) a substituted borazole represented by the general formula (II)

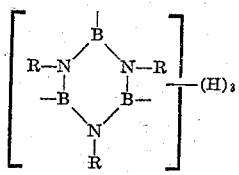

where R has the same meaning as given above with reference to Formula I, and (B) a compound represented by the general formula (III) $nR'M$ where $n$ and R' have the same meanings as given above with reference to Formula I, and M represents an alkali metal (e.g., sodium, potassium, lithium, rubidium, cesium). The number of moles represented by $n$ in Formula III can be fore than 3, in which case there is present a molecular excess of the compound embraced by R'M. When it is desired to substitute a hydrocarbon radical for each of the three hydrogen atoms attached to the boron atoms of the borazole ring, the compounds of (A) and (B) are employed in a molar ratio of 1 mole of the former to at least 3 moles of the latter, e.g., 3, 4, 5, 10 or any higher number of moles, the excess over 3 moles merely being excess R'M compound that is present in the reaction mass.

The present invention is based on our discovery that hydrogen atoms attached to boron atoms of a borazole ring are selectively reactive with a compound of the kind embraced by Formula III so that an organic radical, more particularly a hydrocarbon radical, can be substituted therefor. In other words, the alkali-metal hydrocarbon (R'M) reacts preferentially with the hydrogen attached to the aforesaid boron atoms rather than with the hydrogen attached to the aforesaid nitrogen atoms, the latter hydrogen either being non-reactive with the alkali-metal hydrocarbon or reacting at a much slower rate.

The reaction between the compounds of (A) and (B) is effected (as by contacting together) at a temperature of from about $-75°$ C. (more particularly from about $-15°$ C. to $+30°$ C.) up to the boiling temperature of the reaction mass but below the temperature of decomposition of the reactants and of the borazole reaction product represented by Formula I; for example, the upper temperature in the aforementioned range may be $+200°$ C., or even higher. In general, the temperature at which the reaction is effected is governed by the boiling points of the reactants. The reaction may be effected at atmospheric, sub-atmospheric or super-atmospheric pressure, and in the presence or absence of an essentially non-aqueous, more particularly anhydrous (substantially completely anhydrous), liquid medium which is inert during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. Illustrative examples of such liquid media (solvents or diluents) are diethyl ether, di-n-propyl ether, di-n-butyl ether, dioxane, benzene, toluene and other aromatic hydrocarbons, normal and isomeric pentanes, hexanes, octanes, nonanes and other aliphatic hydrocarbons, chlorobenzene, etc.

When the number of moles of the compound R'M (Formula III), which number is represented by $n$ in that formula, is less than 3, then the reaction of the said compound with the B-trihydrogenborazole (B,B',B"-trihydrogenborazole) embraced by Formula II results in partial substitution of hydrogen atoms by hydrocarbon radicals (R') on the borazole ring, giving the B-monohydrocarbon-B',B"-dihydrogenborazoles and B,B'-dihydrocarbon-B"-monohydrogenborazoles as the main products. Some B,B',B"-trihydrocarbon-substituted borazole may also be formed and be present in the reaction mass, the amount thereof (in general) being the greater the more closely the number of moles of the compound represented by R'M approaches 3.

For certain purposes the reaction mass containing the borazole reaction product can be used as such (e.g., in making other substituted borazoles) without isolating therefrom the borazole reaction product of the method. This practice often is advantageous when the substituted borazole of the method is one having an average of appreciably less than 3 (e.g., from ½ to 2½) unsubstituted hydrogen atoms attached to boron (so-called "B—H" atoms) per borazole ring present in the product, and the isolation of which is unnecessary in making the desired ultimate product. In other cases, more particularly when there are no unsubstituted B—H atoms attached to the borazole ring, the borazole reaction product is preferably isolated from the reaction mass, e.g., by separating the reaction product (as, for example, by filtration or centrifuging, if a solid, or by distillation, crystallization or other suitable means if other than a solid) from the inert, substantially completely anhydrous liquid medium in which the reaction may have been effected. Unreacted R'M compound and alkali-metal compound or compounds formed as by-products of the reaction may be removed from the reaction mass by any suitable means, e.g., by titration with a saturated aqueous solution of NH₄Cl to the point at which the solids settle rapidly from a clear, organic-solvent solution of the borazole reaction product.

Instead of the saturated aqueous solution of ammonium chloride mentioned above, one can use a saturated aqueous solution of an acidic ammonium salt of any other acid having a pK value of less than 4.75. Additional examples of such salts are ammonium sulfate, ammonium nitrate, ammonium bromide, ammonium chlorate, ammonium perchlorate, ammonium tartrate, ammonium sulfite, ammonium bromoacetate, ammonium alpha-bromopropionate, ammonium dichloroacetate, ammonium formate, ammonium fumarate, ammonium phosphate, ammonium dihydrogen phosphate, ammonium pyrophosphate and ammonium trichloroacetate.

Some of the substituted borazoles produced by the method of the present invention are new, while others are old.

Illustrative examples of hydrocarbon radicals represented by R and R', where they appear in the above formulas, are alkyl (including cycloalkyl), alkenyl (including cycloalkenyl), arakyl, aralkenyl, aryl, alkaryl and alkenylaryl. More specific examples of such radicals are methyl, ethyl, propyl, isopropyl, butyl, isobutyl, sec.-butyl, amyl, isoamyl, hexyl to tetracontyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthryl, benzonaphthyl, anthryl, naphthyl-substituted anthryl, dianthryl and fluorenyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc.

Specific examples of compounds embraced by the formula R'M, where R' and M have the same meanings given above, that can be reacted in accordance with the present invention with a B—H borazole of the kind embraced by Formula II, are given in Tables 1 to 5, inclusive, of Rochow, Lewis and Hurd's The Chemistry of Organometallic Compounds, published in 1957 by J. Wiley and Sons, Inc., New York, N.Y., and in the references cited in these tables. It will be will noted that these tables include numerous examples of hydrocarbon-lithium, -sodium, -potassium, -rubidium and -cesium compounds and which can be used as a reactant with a borazole of the kind embraced by Formula II to yield a substituted borazole of the kind embraced by Formula I. These tables also show alkali-metal derivatives wherein the grouping attached to the alkali metal is other than a hydrocarbon radical and which likewise might be used in producing substituted borazoles in accordance with the general principles of the present invention.

Borazoles having aryl, alkyl and halogen substituents attached to the borazole ring are known. The better known compounds are those which are symmetrically substituted. Some of the synthetic routes by which they are obtained are outlined below:

(IV)

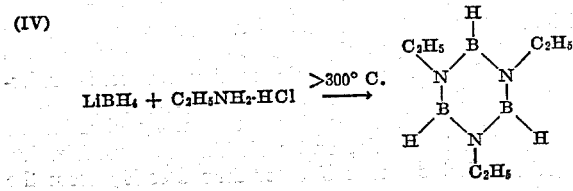

(V)

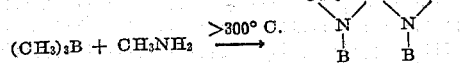

(VI)

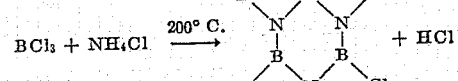

(VII)

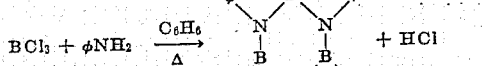

(VIII)

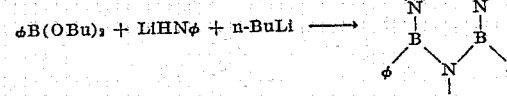

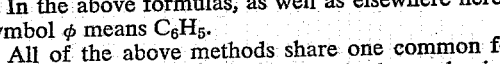

In the above formulas, as well as elsewhere herein, the symbol φ means C₆H₅.

All of the above methods share one common feature, viz.: substituents are "built onto" the borazole ring by a proper choice of the starting material. In many cases the prior methods have utilized vacuum-chain techniques, and the quantities of materials that could be produced were necessarily limited.

Halogenoborazoles are now known (see, for example, U.S. Patent No. 2,754,177, dated July 10, 1956), which fact has aided in advancing the art. The halogenoborazoles can be prepared as illustrated by the following equation in which, for purpose of simplicity only, borazole itself is shown as a starting reactant with 3 moles of a hydrogen halide (HX) to yield a trihalogenoborazole:

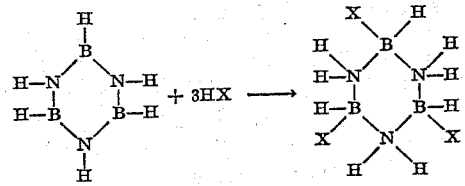

(IX)

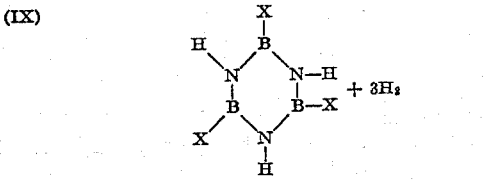

The B—H borazoles used in practicing the present invention can be prepared, for example, through reduction of the corresponding B—Cl borazoles by NaBH₄ in, for instance, polyethylene glycol ethers; or LiBH₄ in di-n-butyl ether; or by NaHB(OCH₃)₃. Another method is by reacting LiBH₄ with ammonium chloride in a hydrocarbon-substituted primary amine hydrochloride in ether, and pyrolyzing the reaction product.

The present invention provides a new and improved method of producing substituted borazoles, both symmetrical and unsymmetrical in good yield and of high purity; and provides a less costly method than the prior methods of producing borazoles of the kind embraced by Formula I in sizeable quantities and without the use of special equipment, as well as the production of new and useful borazoles.

In order that those skilled in the art may better understand how the present invention can be carried into effect, the following examples are given by way of illustration and not by way of limitation. All parts and percentages are by weight unless otherwise stated. Although not essential to the operativeness of the process of the present invention, the examples pertinent to the invention which follow are carried out in an atmosphere of an inert gas, specifically nitrogen, since normally this is conducive to the obtainment of somewhat higher yields.

EXAMPLE 1

This example illustrates the preparation of hexaphenylborazole and of intermediates used in its preparation.

A. Preparation of N-triphenylborazole

A suspension of B,B',B''-trichloro-N,N',N''-triphenylborazole (27.7. g., 0.067 mole) in 150 ml. anhydrous ether is added in small portions over a period of ½ hour to a suspension of lithium aluminum hydride (5.0 g., 0.13 mole) in 200 ml. anhydrous ether. The mixture is stirred for 22 hours at room temperature (20°–30° C.) after the addition has been completed. At the end of this period of time, the reaction mass consists of a gray solid (presumably a mixture of LiCl and AlCl$_3$) suspended in a colorless ether solution containing the N-triphenylborazole dissolved therein. Saturated aqueous ammonium chloride solution is added dropwise with cooling and rapid stirring to the point at which a gray solid settles rapidly from the clear, colorless, ether solution, which is decanted and filtered through anhydrous sodium sulfate. The ether solution is evaporated to dryness at room temperature and aspirator pressure. The colorless, partly crystalline residue is refluxed with dry n-hexane for 45 minutes, and the small amount of insoluble material present therein is removed by filtration. After concentrating the filtrate to about 100 ml. and cooling, the product separates in 13.3 g. yield (64% of the theoretical) as nicely formed prisms; M.P. 154°–157° C. Two recrystallizations from n-hexane provide an analytical sample; M.P., 158°–160° C.

|  | Percent C | Percent H | Percent N | Percent B |
|---|---|---|---|---|
| Analysis calculated for C$_{18}$H$_{18}$N$_3$B$_3$ | 70.01 | 5.87 | 13.61 | 10.51 |
| Found | 69.77 | 6.07 | 13.43 | 10.29 |

B. Preparation of hexaphenylborazole

An ether solution of phenyl lithium is prepared from lithium (6.94 g.; 0.24 g. atom) and bromobenzene (15.7 g.; 0.10 mole) in 150 ml. ether in the usual way. A slurry of N-triphenylborazole (4.6 g.; 0.015 mole) in 100 ml. ether is added to the phenyl lithium solution over a 45-minute period, and the reaction mixture is stirred at room temperature for 17 hours. After this time, the reaction mass is titrated with a saturated aqueous solution of ammonium chloride to the point at which the solids settle rapidly from the stirred solution. The organic solvent (ether) is stripped off, and the total solid residue is transferred to a Soxhlet thimble and continuously extracted with chloroform for 16 hours. The chloroform solution is filtered and concentrated to a volume of 50 ml. On cooling 2.7 g. (34% yield) of hexaphenylborazole separates from solution; M.P.>300° C. (Reported by H. G. Kuivala, Ph.D. Dissertation, Harvard University, 1948, M.P. 423° C.) By infrared comparison this material is found to be identical with authentic hexaphenylborazole obtained by reaction between phenyl lithium and B-trichloro-N-triphenylborazole.

EXAMPLE 2

Preparation of B-tribenzyl-N-triphenylborazole

An ether solution of benzyl lithium is prepared in the usual manner from 0.1 mole benzyl bromide and lithium shot (1.46 g.; 0.21 g. atom). To this solution 0.025 mole of N-triphenylborazole dissolved in benzene is then added dropwise with stirring, and essentially the same procedure is followed as in Example 1–B to yield in this case B-tribenzyl-N-triphenylborazole (B,B',B''-tribenzyl-N,N',N''-triphenylborazole).

EXAMPLE 3

Preparation of B-tri-(cyclohexyl)-N-trinaphthylborazole

An ether solution of cyclohexyl lithium is prepared from 0.1 mole of cyclohexyl iodide and lithium metal (1.46 g.; 0.21 g. atom) in the form of lithium shot. This solution is then added to a benzene solution of 0.025 mole of N-trinaphthylborazole with stirring, the temperature of the reaction mixture being maintained at about 10°–15° C. (N-trinaphthylborazole is prepared by following essentially the same general procedure described under Example 1–A with reference to the production of N-triphenylborazole.) After addition is complete, the ether is allowed to distill off and dry benzene is added to replace the ether. This reaction mixture is then refluxed (heated under reflux at the boiling temperature of the mass) for about 8 hours. Shorter reflux periods, e.g., 1 to 7½ hours, or longer reflux periods, e.g., 8½ to 15 hours or longer, are not precluded. The product, B-tri-(cyclohexyl)-N-trinaphthylborazole (B,B',B''-tri-(cyclohexyl)-N,N',N''-trinaphthylborazole), is isolated from the reaction mass in essentially the same manner described under Example 1.

EXAMPLE 4

Preparation of B-triallyl-N-triphenylborazole

Allyl sodium (0.1 mole) is prepared in the manner described in the literature by A. A. Morton and M. E. T. Holden, J. Am. Chem. Soc., 69, 1675 (1947); R. L. Letsinger and J. G. Traynham, J. Am. Chem. Soc., 70, 3342 (1948), and reacted with a solution of 0.03 mole of N-triphenylborazole in ether in the manner described in the previous examples. The product, B,B',B''-triallyl-N,N',N'' - triphenylborazole (B-triallyl - N - triphenylborazole), is isolated by first titrating the reaction mass with a saturated, aqueous solution of ammonium chloride (as described in Example 1), then filtering through anhydrous sodium sulfate, concentrating the filtrate, adding methanol to the hot solution and allowing the solution to cool at room temperature. After cooling at 0°–5° C. for a half hour or longer, the B-triallyl-N-triphenylborazole is filtered off and air-dried; M.P. 95°–98° C. An ether-methanol mixture is employed as the recrystallizing solvent to give colorless crystals of the product; M.P. 98°–99° C.

EXAMPLE 5

Preparation of B-tri-n-dodecyl-N-triphenylborazole n-Dodecyl potassium (0.1 mole) is prepared essentially in accordance with the procedure described by Meals (J. Org. Chem., 9, 211 [1944]). A solution of N-triphenylborazole (0.03 mole) in 150 ml. anhydrous ether is added dropwise (over a one-hour period) with stirring at room temperature (20°–30° C.) to the n-dodecyl potassium in ether solution. The reaction mixture is refluxed for 12 hours, after which it is cooled to room temperature and titrated with a saturated aqueous solution of ammonium chloride as described in Example 1. The dry ether solution is then concentrated to a volume of ca. 200 ml., after which methanol is added until the crystalline product, B-tri-n-dodecyl-N-triphenylborazole (B,B',B''-tri-n-dodecyl-N,N',N''-triphenylborazole), separates from solution. The precipitation is completed by storing in a refrigerator for several hours, and the product is then collected by filtration on a funnel cooled to 0° C.

EXAMPLE 6

*Preparation of B-triphenyl-N-trimethylborazole*

Phenyl lithium is prepared from lithium (1.32 g.; 0.19 g. atom) and bromobenzene (14.9 g.; 0.095 mole) in a total volume of 200 cc. anhydrous ether (diethyl ether). The phenyl lithium solution is added dropwise over a ½-hour period to a stirred solution of 3.68 g. (0.03 mole) of N-trimethylborazole (N,N′,N″ - trimethylborazole), B.P. 132° C., in 100 cc. anhydrous ether. After addition is complete, the reaction mixture is refluxed for 2 hours and then allowed to stand for about 16 hours at room temperature (20°–30° C.) by the end of this time, a considerable amount of solid has separated from the solution. The solvent is stripped off at reduced pressure and the solid residue is refluxed with n-hexane (500 cc.) for one hour, with some solid remaining insoluble. The solution is filtered several times to remove the cloudiness. The clear solution is then concentrated and cooled to give B-triphenyl-N-trimethylborazole (B,B′,B″-triphenyl-N,N′,N″-trimethylborazole) in two crops. Weight, 5.3 g. (yield: 50.5% of the theoretical). M.P. 268°–270° C. This material is found by infrared comparison to be identical with an authentic sample of B-triphenyl-N-trimethylborazole prepared by reaction of B-trichloro-N-trimethylborazole with phenyl magnesium bromide.

EXAMPLE 7

*Preparation of B-tri-p-tolyl-N-tri-(cyclohexyl)-borazole*

The subject compound is produced by reacting 0.095 mole of p-tolyl lithium with 0.024 mole of N-tri-(cyclohexyl)borazole following essentially the same procedure described under Example 6 with reference to the preparation of B-triphenyl-N-trimethylborazole.

EXAMPLE 8

*Preparation of B-trioctadecyl-N-tri-n-propyl-borazole*

Using 0.08 mole of octadecyl lithium and 0.02 mole of N-tri-n-propylborazole, essentially the same procedure is followed in making B-trioctadecyl-N-tri-n-propyl-borazole as is described under Example 6 with reference to the preparation of B-triphenyl-N-trimethylborazole.

EXAMPLE 9

*Preparation of B-triphenyl-N-tri-p-tolylborazole*

A solution of N-tri-p-tolylborazole (0.05 mole) in benzene at about 20°–30° C. is added to a solution of phenyl lithium (0.15 mole) in benzene at 20°–30° C. over a one-hour period. (N-tri-p-tolylborazole is prepared by following essentially the same general procedure described under Example 1–A with reference to the preparation of N-triphenylborazole.) The reaction mixture is refluxed for 10 hours and, after cooling to room temperature, it is titrated with a saturated aqueous solution of ammonium chloride as described in Example 1–B. The organic solvent is stripped off under reduced pressure and the solid residue is extracted continuously with chloroform in a Soxhlet apparatus. Concentration of the chloroform solution and cooling to room temperature yields a crystalline material comprising B-triphenyl-N-tri-p-tolylborazole (B,B′,B″-triphenyl-N,N′,N″-tri-p-tolylborazole). This product is purified by recrystallizing from chloroform or chlorobenzene after clarifying with decolorizing carbon.

EXAMPLE 10

A solution of n-butyl lithium, prepared in the usual way from lithium metal (1.1 g.; 0.16 g. atom) and n-butyl bromide (10.96 g.; 0.08 mole) in 60 ml. ether, is added dropwise over a ½-hour period to a solution of N-triphenylborazole (6.16 g.; 0.02 mole) in 100 ml. ether. The reaction mixture is then allowed to stand for about 16 hours at room temperature (20°–30° C.). After cooling the reaction flask in an ice-water bath, the reaction mass is titrated with a saturated aqueous ammonium chloride solution to the point at which the lithium salts settle rapidly from the stirred solution. The supernatant ether solution is decanted from the insoluble salts which, in turn, are washed with three 25 ml. portions of fresh ether. The combined ether solutions are then concentrated and methanol added to the boiling ether solution until the product begins to separate from solution. After cooling to room temperature and collecting by filtration, there is obtained 5.3 g. of B-tri-n-butyl-N-triphenylborazole of M.P. 127°–129° C.; yield: 56%.

EXAMPLE 11

*Preparation of hexa-n-butylborazole*

Hexa-n-butylborazole is prepared in essentially the same manner described under Example 10 with reference to the preparation of B-tri-n-butyl-N-triphenylborazole with the exception that 0.02 mole of N-tri-n-butylborazole is used instead of 0.02 mole of N-triphenylborazole.

EXAMPLE 12

*Preparation of B-triphenyl-N-triallylborazole*

B-triphenyl-N-triallylborazole is prepared from 0.75 mole of phenyl lithium and 0.20 mole of N-triallylborazole following essentially the same procedure described under Example 10 with reference to the production of B-tri-n-butyl-N-triphenylborazole.

EXAMPLE 13

*Preparation of unsymmetrical borazoles*

A. To a solution of 0.1 mole of N-triphenylborazole in benzene at 20°–30° C. is added 0.1 mole phenyl lithium in ether solution over a period of about one hour. The resulting mixture, after refluxing for about one hour, contains the reactive intermediate B,N,N′,N″-tetraphenylborazole (X)

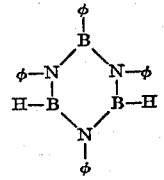

B. To the cooled (about 20°–30° C.) reaction mass from (A), 0.1 mole of methyl lithium in ether solution is added dropwise over a period of about one hour, and the resulting reaction mixture is refluxed for about one hour. This contains the reactive intermediate, N-triphenyl-B-phenyl-B′-methylborazole.

C. To the partly cooled reaction mass from (B) is added 0.1 mole of allyl sodium (prepared as in Example 4) over a period of about one hour, and refluxing is continued for an additional hour. The resulting reaction mass is titrated with a saturated, aqueous solution of ammonium chloride, and then worked up as in Example 4 to give the unsymmetrically substituted compound, N-triphenyl-B-phenyl-B′-methyl-B″-allylborazole (XI)

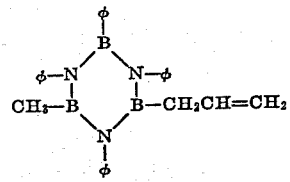

The substituted borazoles produced by the method of this invention range from liquids to semi-solids and solids in normal state. They are useful, for instance, as components of flame-resisting compositions; as plasticizers; as fuel additives; as scintillation counters; as the active ingredient in insecticides, bactericides, germicides, fungicides, pesticides and the like; as a chemical intermediate for use in the preparation of other compounds; as a component of arc-extinguishing tubes, and especially of surfaces that are exposed to the action of the arc. Other uses include: as rocket fuels or as components of such fuels; as polymer additives to impart neutron-absorbing properties to the polymer to which it is added and to improve the thermal stability of the polymer; as heat-exchange media or as modifiers of such media whereby they can be used at higher temperatures; as petroleum additives which are hydrolytically stable (e.g., viscosity-index improvers, lubricants and greases for high-temperature applications, cetane improvers, ignition promoters, anti-knock agents, preventives of pre-ignition, etc.); and in making new types of dyes and pigments. Some of them, for instance those containing reactive hydrogen or polymerizable groups, are also useful as cross-linking agents in resinous compositions.

The homopolymerizable and/or copolymerizable substituted borazoles produced by the method of this invention can be employed alone or in combination with other substances that are copolymerizable therewith to yield new synthetic materials (homopolymers and copolymers) having particular utility in the plastic and coating arts. The following examples illustrate more specifically the utility of substituted borazoles produced in accordance with the present invention.

EXAMPLE 14

Ten (10) parts of B,B',B''-triallyl-N,N',N''-triphenyl-borazole is dissolved in 90 parts of benzine (in which it is very soluble), and about 0.3 part of a 75% solution of pinane hydroperoxide in pinane is added thereto. The mixture is agitated to obtain a homogeneous solution, after which a portion is cast on glass plate. The coated plate is placed in an oven maintained at about 150° C. After about 6 hours at this temperature homopolymerization of the monomer is evident. The resulting film of polymer is insoluble in benzene, which is a good solvent for the monomer. The film is effective against both slow and fast neutrons but especially against slow neutrons, and may be adhesively bonded or otherwise united to polymeric methyl methacrylate or other plastic material, concrete or other substrate suitable for this purpose.

B-triallyl-N-triphenylborazole and members of the broader class of B-unsaturated borazoles embracing the same are believed to be new chemical compounds.

EXAMPLE 15

Hexa-n-butylborazole in finely divided state is suspended in a viscous polymer obtained by incompletely polymerizing methyl methacrylate monomer. The resulting suspension is cast between glass plates to from a 3/16-inch sheet and is then hardened by heating at about 75°-85° C. The resulting sheet has a hexa-n-butylborazole concentration, calculated as boron, of 0.3 g. boron per sq. cm. of shield surface and is effective in reducing the intensity of a beam of thermal neutrons.

Instead of hexa-n-butylborazole in the foregoing example, one can use, with varying degrees of effectiveness, any of the other substituted borazoles produced by the method of the present invention, and especially when the amount thereof calculated as boron provides a concentration of boron ranging from 0.1 g. to 0.5 g. boron per sq. cm. of shield surface.

In any of the aforementioned and other applications or uses, one can employ a single compound of the kind embraced by Formula I or a plurality of such compounds in any proportions. They can be used in conjunction with any of the conventional components of flame-resisting compositions, plasticizers, insecticides, bactericides, germicides, fungicides, pesticides, and other compositions hereinbefore mentioned by way of illustrating the fields of utility, generically and specifically, of the substituted borazoles produced by the method of this invention.

Instead of using a hydrocarbon derivative of an alkali metal (R'M in Formula III) as a reactant (coupling agent) with a borazole of the kind embraced by Formula II, one may use an equivalent amount of a compound represented by the formula (XII) 

where R'' and R''' each represent a hydrocarbon radical that may be the same or different, and M' represents a metal of group II of the periodic table of the elements, and more specifically beryllium, magnesium, calcium, strontium and barium of group IIA and zinc, cadmium and mercury of group IIB. Examples of compounds embraced by Formula XII are:

Dimethyl beryllium
Diethyl beryllium
Diphenyl beryllium
Diethyl magnesium
Diphenyl magnesium
Diethyl strontium
Diphenyl barium
Di-n-butyl barium
Dimethyl zinc
Diphenyl zinc
Diethyl cadmium
Dimethyl cadmium
Di-(hydrocarbon) mercuries ($R_2Hg$), numerous examples of which are given in F. C. Whitmore's Organic Compounds of Mercury; Chemical Catalog Company, New York, 1921

For further information concerning compounds embraced by Formulas III and XII and additional examples thereof see, for instance, G. E. Coates, Organo-metallic Compounds, Methuen and Co., Ltd., London, 1956; and E. Krause and A. von Grosse, Die Chemie der Metallorganischen Verbindungen, Berlin, 1937.

We claim:
1. A method of producing borazoles represented by the general formula

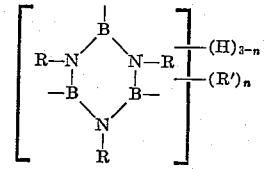

where R represents a member of the class consisting of hydrogen and hydrocarbon radicals, R' represents a hydrocarbon radical, and n represents a number from 1 to 3, inclusive, said method comprising effecting reaction between ingredients consisting essentially of (A) a borazole represented by the general formula

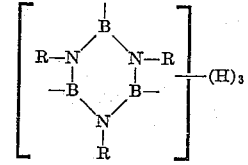

where R has the same meaning as given above and (B) a compound represented by the general formula nR'M where n and R' have the same meanings as given above, and M represents an alkali metal, the reaction between the compounds of (A) and (B) being effected under substantially completely anhydrous conditions and at a temperature of from about −75° C. up to the boiling temperature of the reaction mass but below the temperature of decomposition of the reactants and of the borazole reaction product represented by the above formula.

2. A method as in claim 1 wherein n represents 3.

3. A method as in claim 1 wherein the reaction between the compounds of (A) and (B) is effected in the presence of an inert, substantially completely anhydrous, liquid medium.

4. A method of producing borazoles represented by the general formula

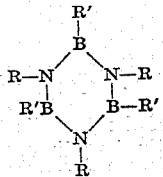

where R represents a member of the class consisting of hydrogen and hydrocarbon radicals, and R' represents a hydrocarbon radical, said method comprising effecting reaction between ingredients consisting essentially of (A) a borazole represented by the general formula

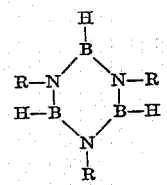

where R has the same meaning as given above and (B) a compound represented by the general formula R'M where R' has the same meaning as given above, and M represents an alkali metal, the compounds of (A) and (B) being employed in a molar ratio of 1 mole of the former to at least 3 moles of the latter and the reaction between the said compounds being effected under substantially completely anhydrous conditions and at a temperature of from about $-75°$ C. up to the boiling temperature of the reaction mass but below the temperature of decomposition of the reactants and of the borazole reaction product represented by the above formula; and isolating from the resulting reaction mass a borazole embraced by the first-given formula.

5. A method of preparing hexaphenylborazole which comprises effecting reaction in a substantially completely anhydrous, liquid medium and at a temperature ranging between about 20° C. and the reflux temperature of the reaction mass, between ingredients consisting essentially of (1) N-triphenylborazole and (2) phenyl lithium, the compounds of (1) and (2) being employed in a molar ratio of 1 mole of the former to at least 3 moles of the latter; and isolating hexaphenylborazole from the resulting reaction mass.

6. A method of preparing B-triphenyl-N-trimethylborazole which comprises effecting reaction in a substantially completely anhydrous, liquid medium and at a temperature ranging between about 20° C. and the reflux temperature of the reaction mass, between ingredients consisting essentially of (1) N-trimethylborazole and (2) phenyl lithium, the compounds of (1) and (2) being employed in a molar ratio of 1 mole of the former to at least 3 moles of the latter; and isolating B-triphenyl-N-trimethylborazole from the resulting reaction mass.

7. A method of preparing B-tri-n-butyl-N-tri-phenylborazole which comprises effecting reaction in a substantially completely anhydrous, liquid medium and at a temperature ranging between about 20° C. and the reflux temperature of the reaction mass, between ingredients consisting essentially of (1) N-triphenylborazole and (2) n-butyl lithium, the compounds of (1) and (2) being employed in a molar ratio of 1 mole of the former to at least 3 moles of the latter; and isolating B-tri-n-butyl-N-triphenylborazole from the resulting reaction mass.

No references cited.

UNITED STATES PATENT OFFICE
Certificate of Correction

Patent No. 2,917,543 December 15, 1959

Janet Hall Smalley et al.

It is hereby certified that error appears in the printed specification of the above numbered patent requiring correction and that the said Letters Patent should read as corrected below.

Column 1, line 37, after "by" strike out —the—; line 66, for "fore" read —more—; column 3, line 28, for "arakyl" read —aralkyl—; line 51, strike out "will", second occurrence; column 7, line 15, for "by" read —By—; column 9, line 25, for "plastic" read —plastics—; line 32, for "benzine" read —benzene—; line 36, after "on" insert —a—; line 55, for "from" read —form—; column 11, lines 10 to 17, the formula should appear as shown below instead of as in the patent—

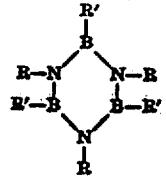

Signed and sealed this 28th day of June 1960.

[SEAL]

Attest:
KARL H. AXLINE,
*Attesting Officer.*

ROBERT C. WATSON,
*Commissioner of Patents.*